(12) United States Patent
Chung et al.

(10) Patent No.: US 10,164,435 B2
(45) Date of Patent: Dec. 25, 2018

(54) REACTIVE POWER COMPENSATOR AND METHOD OF CONTROLLING THE SAME

(71) Applicants: LSIS CO., LTD., Anyang-si, Gyeonggi-do (KR); Seoul National University R&DB FOUNDATION, Seoul (KR)

(72) Inventors: Yong Ho Chung, Anyang-si (KR); Gum Tae Son, Anyang-si (KR); Seung Ki Sul, Seoul (KR); Jae Jung Jung, Seoul (KR); Joon Hee Lee, Gyeongsangbuk-do (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 15/870,131

(22) Filed: Jan. 12, 2018

(65) Prior Publication Data
US 2018/0212430 A1 Jul. 26, 2018

(30) Foreign Application Priority Data

Jan. 26, 2017 (KR) ........................ 10-2017-0012942

(51) Int. Cl.
*H02J 3/18* (2006.01)
(52) U.S. Cl.
CPC ................................ *H02J 3/1807* (2013.01)
(58) Field of Classification Search
CPC ........ H02M 3/285; H02M 7/49; H02M 7/493; H02M 7/7575; H02M 5/458; H02M 3/1584; H02M 3/33561; H02M 1/4208; H02M 7/00; H02M 7/066; H02M 3/33592; H02M 7/217; H02H 7/261; H02H 7/268; H02J 3/36; H02J 3/38
See application file for complete search history.

(56) References Cited

U.S. PATENT DOCUMENTS

| | | | | |
|---|---|---|---|---|
| 9,379,623 | B2 * | 6/2016 | Zhang | H02M 3/33523 |
| 9,496,805 | B2 * | 11/2016 | Akagi | H02M 7/483 |
| 2011/0280049 | A1 * | 11/2011 | Mori | H02M 1/4216 |
| | | | | 363/25 |

FOREIGN PATENT DOCUMENTS

| | | |
|---|---|---|
| KR | 20140087924 A | 7/2014 |
| KR | 20150004725 A | 1/2015 |
| KR | 20150102640 A | 9/2015 |
| KR | 20160001977 A | 1/2016 |

OTHER PUBLICATIONS

IEEE; "Proceedings" IEEE Energy Conversion Congress & Expo; Milwaukee, WI; Sep. 18-22, 2016; (34 pages).

* cited by examiner

*Primary Examiner* — Nguyen Tran
(74) *Attorney, Agent, or Firm* — K&L Gates LLP (57) ABSTRACT

A reactive power compensator includes a plurality of phase clusters each including plurality of cells and a controller configured to control the plurality of phase clusters. The controller performs control to generate an offset signal through phasor transformation based on respective voltage values and current values of the plurality of phase clusters and to compensate for energy errors between the plurality of phase clusters based on the generated offset signal.

24 Claims, 10 Drawing Sheets

REACTIVE POWER COMPENSATOR AND METHOD OF CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2017-0012942 filed on Jan. 26, 2017, in the Korean Intellectual Property Office, the disclosure of which is hereby incorporated by reference in its entirety.

FIELD

Embodiments relate to a reactive power compensator and a method of controlling the same.

BACKGROUND

With development of industry and population increase, power consumption has rapidly increased but power generation has some limitations.

Therefore, a power system for stably supplying power generated in a generation area to a consumption area without loss has gradually become important.

A necessity of a flexible AC transmission system (FACTS) for improving power flow, system voltage and stability has arisen. A STATic synchronous COMpensator (STATCOM) which is a third-generation power compensator of a FACTS is connected to a power system in parallel to compensate for reactive power and active power necessary for the power system.

Figure 1:
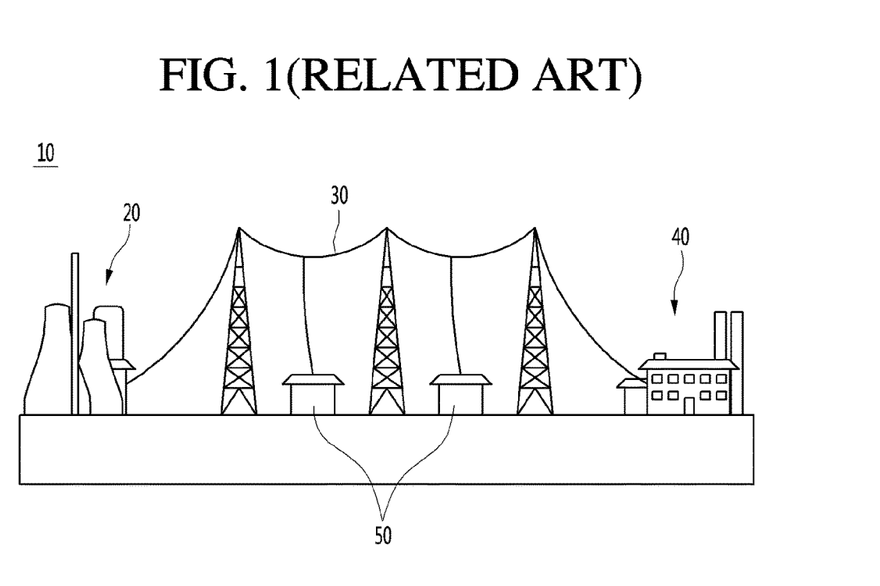
FIG. 1 is a diagram showing a general power supply system.

FIG. 1 shows a general power supply system.

As shown in FIG. 1, the general power supply system 10 may include a power source 20, a power system 30, a load 40 and a plurality of reactive power compensators 50.

The power source 20 refers to a place or apparatus, in which power is generated, and may be understood as a generator for generating power.

The power system may mean all apparatuses including a power line, a steel tower, an arrester and an insulator, for transmitting power generated by the power source 20 to the load 40.

The load 40 means a place or apparatus for consuming power generated by the power source 20 and may be understood as a consumer for consuming power.

The reactive power compensator 50 is a STATCOM, which is connected to the power system 30 to compensate for lack of reactive power upon lack of reactive power in power flowing to the power system 30.

The reactive power compensator 50 includes a converter for converting AC power of the power system into DC power or converting DC power into AC power.

The converter includes clusters each including a plurality of cells connected to each other in series with respect to three phases.

Figure 2A:
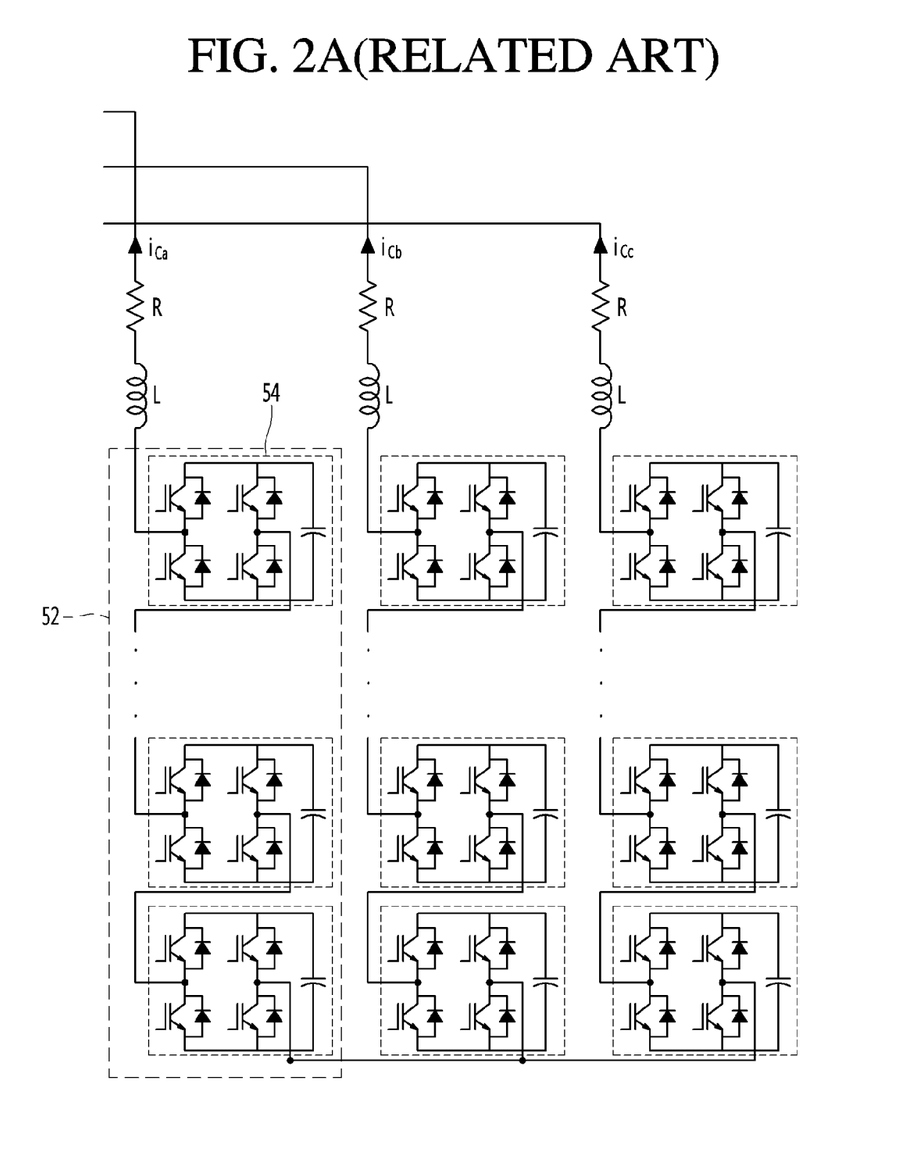
FIG. 2A is a circuit diagram of a converter having a star connection topology.
Figure 2B:
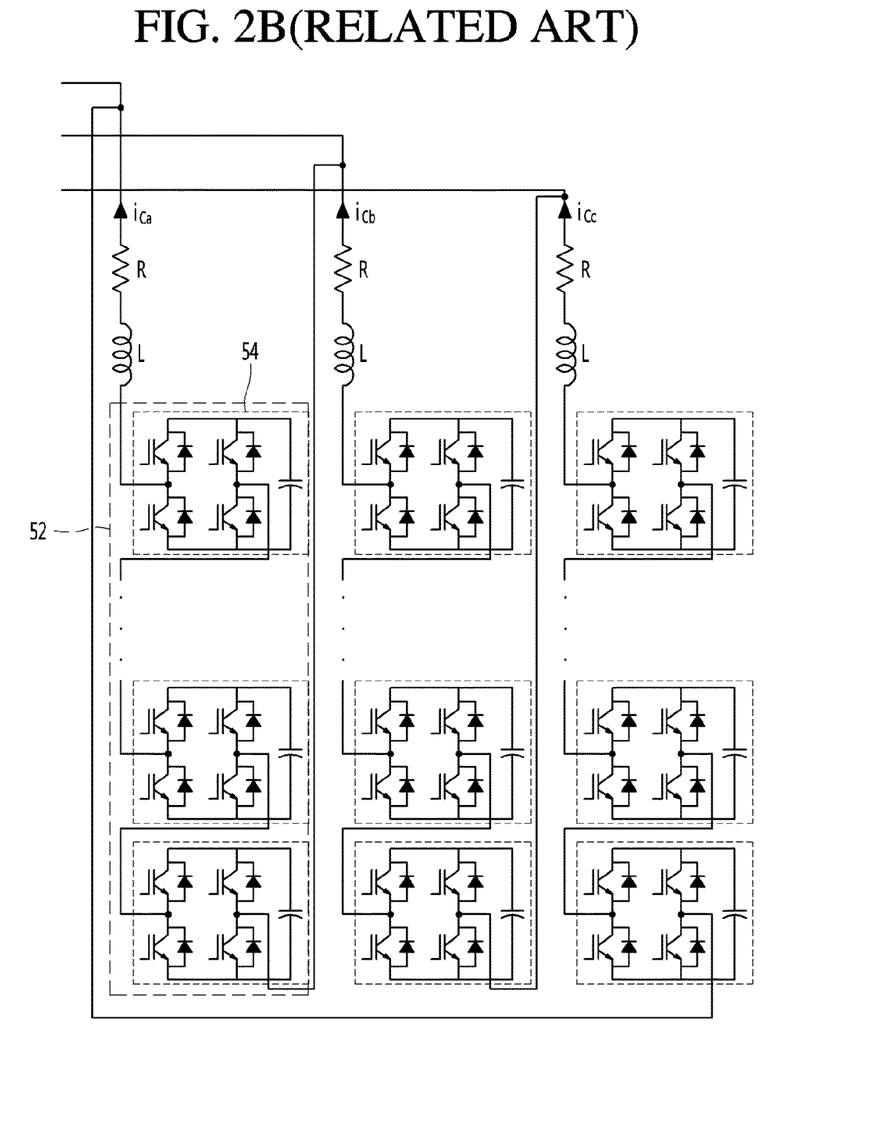
FIG. 2B is a circuit diagram of a converter having a delta connection topology.

FIG. 2A is a circuit diagram of a converter having a star connection topology and FIG. 2B is a circuit diagram of a converter having a delta connection topology.

As shown in FIGS. 2a and 2b, the plurality of cells 54 is respectively connected to each other in each of three-phase clusters 53.

In a converter having a star connection topology or a converter having a delta connection topology, in order to obtain high reliability and excellent driving performance, uniform energy control among clusters and uniform voltage control among the cells of the cluster are important.

For uniform energy control among the clusters, a zero-sequence voltage is used in the converter having start connection topology and zero-sequence current is used in the converter having the delta connection topology.

In the related art, in a uniform control method using a zero-sequence voltage, control is impossible and calculation is complicated when current is not supplied.

In the related art, in a uniform control method using zero-sequence current, a negative sequence component is not considered and thus reliability of uniform control is lowered.

In the related art, in the uniform control method, since zero-sequence voltage and current are calculated using error values among energies of clusters, when external disturbance occurs, a large overshoot or transient voltage may be generated. Accordingly, if a withstand voltage of a capacitor or a switching element of a cell (submodule) is low, the system cannot continuously operate.

SUMMARY

An object of the present invention is to solve the above-described and other problems.

Another object of the present invention is to provide a reactive power compensator capable of performing uniform control with high reliability and stability and a method of controlling the same.

According to an aspect of the present invention, a reactive power compensator for compensating for reactive power of a power system includes a plurality of phase clusters each including plurality of cells and a controller configured to control the plurality of phase clusters. The controller generates an offset signal through phasor transformation based on respective voltage values and current values of the plurality of phase clusters and compensates for energy errors between the plurality of phase clusters based on the generated offset signal.

According to another aspect of the present invention, a method of controlling a reactive power compensator for compensating for reactive power of a power system includes performing phasor transformation with respect to voltage values and current values of a plurality of phase clusters each including a plurality of cells to generate a phasor diagram, generating an offset signal on the phasor diagram, generating a command value, to which the offset signal of a zero-sequence component is applied, and controlling the plurality of phase clusters using the command value to compensate for energy errors between the plurality of phase clusters.

DETAILED DESCRIPTION OF THE EMBODIMENTS

Hereinafter, the embodiments of the present invention will be described in detail with reference to the accompanying drawings, in which the same or similar portions are denoted by the same reference numerals and repeated descriptions thereof will be omitted. The suffixes "module" and "unit" of elements herein are used for convenience of description and thus can be used interchangeably and do not have any distinguishable meanings or functions. In describing the present invention, a detailed description of known functions and configurations will be omitted when it may obscure the subject matter of the present invention. The accompanying drawings are used to help easily understand the technical idea of the present invention and it should be understood that the idea of the present invention is not limited by the accompanying drawings. The idea of the present invention should be construed to extend to any alterations, equivalents and substitutions besides the accompanying drawings.

Figure 3:
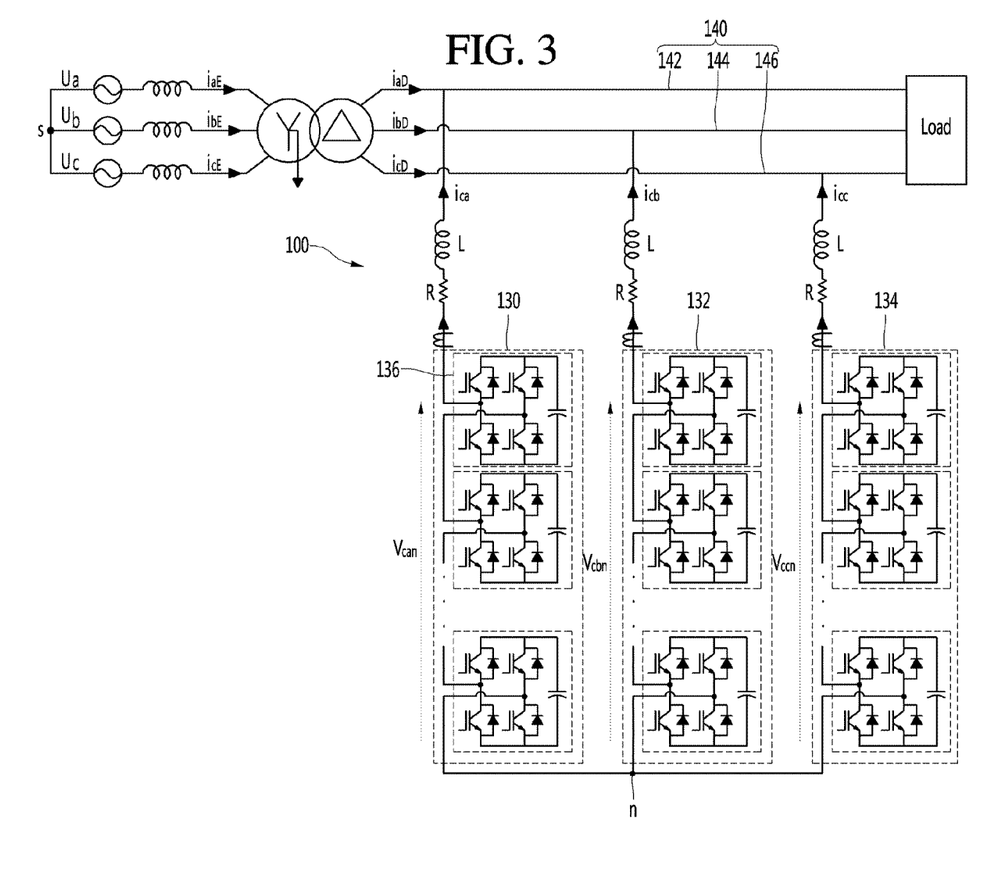
FIG. 3 is a diagram showing a power supply system including a reactive power compensator having a star connection topology according to an embodiment.

FIG. 3 is a diagram showing a power supply system including a reactive power compensator having a star connection topology according to an embodiment.

As shown in FIG. 3, the reactive power compensator 100 having a star connection topology is connected to a power system 140 in parallel, thereby compensating for reactive power necessary for the power system 140.

In the reactive power compensator 100 having a star connection topology, first-phase to third-phase clusters 130, 132 and 134 may be individually connected to three-phase lines 142, 144 and 146 of the power system 140.

Specifically, the first-phase cluster 130 may be connected between the first-phase line 142 of the power system 140 and a node n, the second-phase cluster 132 may be connected between the second-phase line 144 of the power system 140 and the node n, and the third-phase cluster 134 may be connected between the third-phase line 146 of the power system 140 and the node n.

Each of the clusters 130, 132 and 134 may include a plurality of cells 136 connected to each other in series. Each cell 136 may include a plurality of switching elements, a plurality of diodes connected to the switching elements in parallel, and capacitors.

When the power system 140 operates, the capacitors of each cell 136 may be frequently charged or discharged.

AC reactive power may be generated by a sum of the voltages of the capacitors of each cell 136 according to the number of selected or unselected cells 136 in each of the clusters 130, 132 and 134 and compensated for in the power system 140.

Selection of the cell 136 may mean activation of the cell 136 and non-selection of the cell 136 may mean inactivation of the cell 136.

When the cell 136 is selected, a specific switching element of the plurality of switching elements in the cell 136 may be turned on to output the voltage of the capacitor.

When the cell 136 is unselected, a current flow path to the capacitor of the cell 136 is not formed and the cell 136 is bypassed, thereby not outputting the voltage of the capacitor of the cell 136.

If each of the first-phase to third-phase clusters 130, 132 and 134 has a star connection topology, a voltage applied to the first-phase cluster 130 may be $v_{can}$, a voltage applied to the second-phase cluster 132 may be $v_{cbn}$, and a voltage applied to the third-phase cluster 134 may be $v_{ccn}$.

$v_{can}$, $v_{cbn}$ and $v_{ccn}$ may be expressed as shown in Equation 1.

$$v_{can} = -V_m^+ \sin(\omega t) - V_m^- \sin(\omega t + \phi_v^-) - V_0 \sin(\omega t + \phi_0) = \quad \text{[Equation 1]}$$
$$-V_{ma}\sin(\omega t + \phi_{cva}) - V_0 \sin(\omega t + \phi_0)$$

$$v_{cbn} = -V_m^+ \sin\left(\omega t - \frac{2\pi}{3}\right) - V_m^- \sin\left(\omega t + \phi_v^- + \frac{2\pi}{3}\right) -$$
$$V_0 \sin(\omega t + \phi_0) = -V_{mb}\sin(\omega t + \phi_{cvb}) - V_0 \sin(\omega t + \phi_0)$$

$$v_{ccn} = -V_m^+ \sin\left(\omega t + \frac{2\pi}{3}\right) - v_m^- \sin\left(\omega t + \phi_v^- - \frac{2\pi}{3}\right) -$$
$$V_0 \sin(\omega t + \phi_0) = -V_{mc}\sin(\omega t + \phi_{cvc}) - V_0 \sin(\omega t + \phi_0)$$

where, $V_m^+$ denotes the magnitude of a positive sequence component, $V_m^-$ denotes the magnitude of a negative sequence component, and $v_0$ denotes the magnitude of a zero-sequence component. In addition, $\emptyset_v^-$ denotes the phase of the negative sequence component and $\emptyset_0$ denotes the phase of a zero-sequence component.

In addition, each of $V_{ma}$, $V_{mb}$ and $V_{mc}$ may denote a sum of the magnitude $V_m^+$ of the positive sequence component and the magnitude of the negative sequence component and each of $\emptyset_{cva}$, $\emptyset_{cvb}$ and $\emptyset_{cvc}$ may denote the phase of the positive sequence component and the negative sequence component.

Accordingly, each of $v_{can}$, $v_{cbn}$ and $v_{ccn}$ may have a waveform of an AC voltage including the positive sequence component $V_m^+$, the negative sequence components $V_m^-$ and and the zero-sequence components $v_0$ and $\emptyset_0$.

Current flowing in the first-phase cluster 130 may be $i_{ca}$, current flowing in the second-phase cluster 132 may be $i_{cb}$, and current flowing in the third-phase cluster 134 may be $i_{cc}$.

$i_{ca}$, $i_{cb}$ and $i_{cc}$ may be expressed as shown Equation 2.

$$i_{ca} = -I_m^+ \sin(\omega t + \emptyset_i^+) - I_m^- \sin(\omega t + \phi_i^-) = -I_{ma}\sin(\omega t + \phi_{cia}) \quad \text{[Equation 2]}$$

$$i_{cb} = -I_m^+ \sin\left(\omega t + \phi_i^+ - \frac{2\pi}{3}\right) - I_m^- \sin\left(\omega t + \phi_i^- + \frac{2\pi}{3}\right) =$$
$$-I_{mb}\sin(\omega t + \phi_{cib})$$

$$i_{cc} = -I_m^+ \sin\left(\omega t + \phi_i^+ + \frac{2\pi}{3}\right) - I_m^- \sin\left(\omega t + \phi_i^- - \frac{2\pi}{3}\right) =$$
$$-I_{mc}\sin(\omega t + \phi_{cic})$$

where, $I_m^+$ may denote the magnitude of the positive sequence component and $I_m^-$ may denote the magnitude of the negative sequence component. In addition, $\emptyset_i^+$ may denote the phase of the positive sequence component and $\emptyset_i^-$ may denote the phase of the negative sequence component.

In addition, each of $I_{ma}$, $I_{mb}$ and $I_{mc}$ may denote a sum of the magnitude of the positive sequence component and the magnitude of the negative sequence component and each of $\emptyset_{cia}$, $\emptyset_{cib}$ and $\emptyset_{cic}$ may denote a sum of the phase of the positive sequence component and the phase of the negative sequence component.

Accordingly, each of $i_{ca}$, $i_{cb}$ and $i_{cc}$ may have the waveform of AC current including the positive sequence components $I_m^+$ and $\emptyset_i^+$ and the negative sequence components $I_m^-$ and $\emptyset_i^-$.

In summary, in the first-phase to third-phase clusters 130, 132 and 134 having a star connection topology, the voltages $v_{can}$, $v_{cbn}$ and $v_{ccn}$ applied to the clusters 130, 132 and 134 include all of the positive sequence component $V_m^+$, the negative sequence components $V_m^-$ and $\emptyset_v^+$ and the zero-sequence components $v_0$ and $\emptyset_0$, but currents $i_{ca}$, $i_{cb}$ and $i_{cc}$ flowing in the clusters 130, 132 and 134 include the positive sequence components $I_m^+$ and $\emptyset_i^+$ and the negative sequence components $I_m^-$ and $\emptyset_i^-$ but do not include the zero-sequence component.

Figure 4:
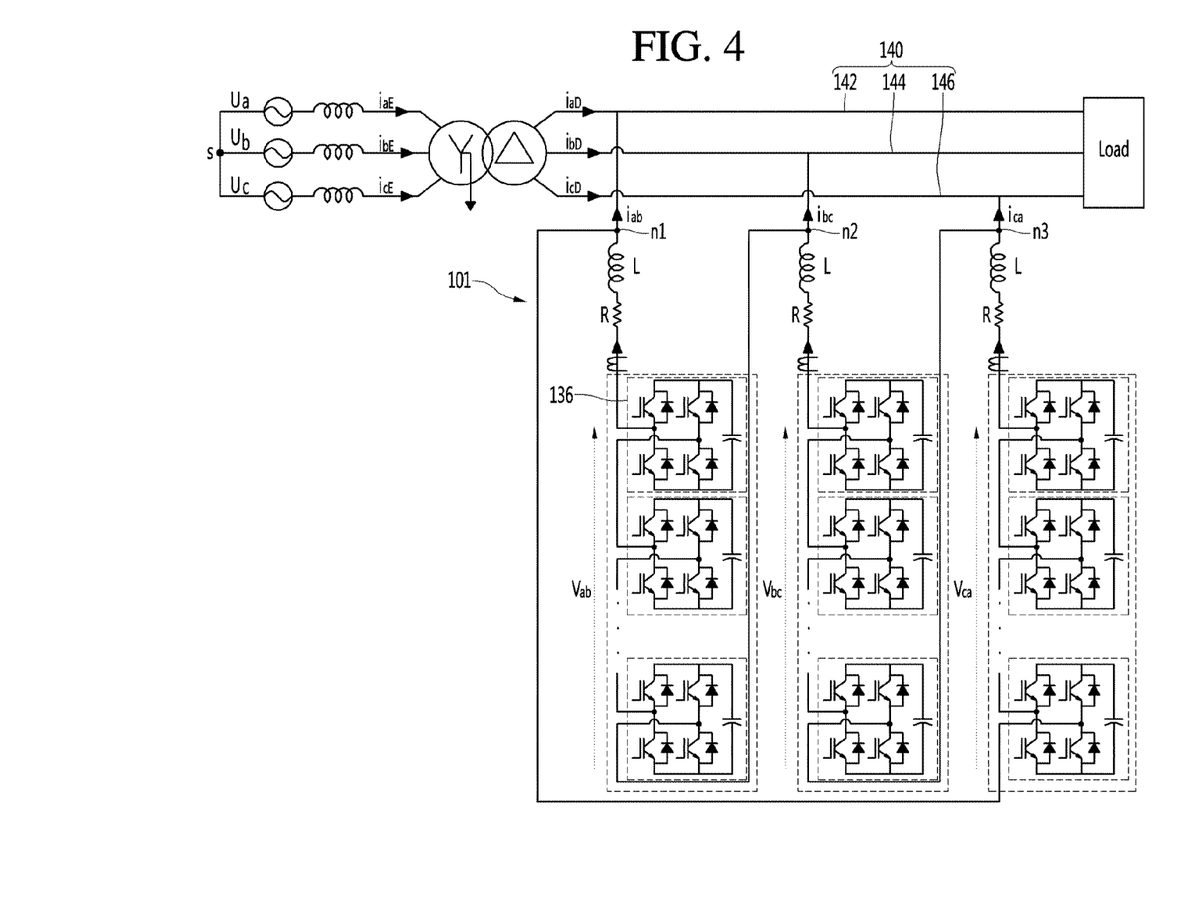
FIG. 4 is a diagram showing a power supply system including a reactive power compensator having a delta connection topology according to an embodiment.

Alternatively, as described below, in the first-phase to third-phase clusters 130, 132 and 134 having a delta connection topology, the voltages $v_{can}$, $V_{cbn}$ and $V_{ccn}$ applied to the clusters 130, 132 and 134 include the positive sequence component and the negative sequence component but do not include the zero-sequence component, but currents $i_{ca}$, $i_{cb}$ and $i_{cc}$ flowing in the clusters 130, 132 and 134 include all the positive sequence component, the negative sequence component and the zero-sequence component.

In the reactive power compensator 100 having the first-phase to third-phase clusters 130, 132 and 134 having the star connection topology, uniform control among the clusters 130, 132 and 134 is performed using a zero-sequence voltage which is the zero-sequence component. In the reactive power compensator 100 having the first-phase to third-phase clusters 130, 132 and 134 having the delta connection topology, uniform control among the clusters 130, 132 and 134 is performed using zero-sequence current which is the zero-sequence component.

FIG. 4 is a diagram showing a power supply system including a reactive power compensator having a delta connection topology according to an embodiment.

As shown in FIG. 4, a reactive power compensator 101 having a delta connection topology may be connected to the power system 140 in parallel to compensate for reactive power necessary for the power system 140.

In the reactive power compensator 101 having the delta connection topology, the first-phase to third-phase clusters 130, 132 and 134 may be the three-phase lines 142, 144 and 146 of the power system 140.

Specifically, the three-phase lines 142, 144 and 146 of the power system 140 may be connected to first to third nodes n1, n2 and n3.

The first-phase cluster 130 may be connected between the first node n1 and the second node n2, the second-phase cluster 132 may be connected between the second node n2 and the third node n3, and the third-phase cluster 134 may be connected between the third node n3 and the first node n1.

The detailed configuration of the first-phase to third-phase clusters 130, 132 and 134 having the delta connection topology may be equal to that of the first-phase to third-phase clusters 130, 132 and 134 having the star connection topology.

The desired waveforms of an AC voltage and AC current may be generated according to the number of selected cells 136 in the clusters 130, 132 and 134.

If the first-phase to third-phase clusters 130, 132 and 134 have a delta connection topology, the voltage applied to the first-phase cluster 130 may be $v_{ab}$, the voltage applied to the second-phase cluster 132 may be $v_{bc}$, and the voltage applied to the third-phase cluster 134 may be $v_{ca}$.

$v_{ab}$, $v_{bc}$ and $v_{ca}$ may be expressed as shown in Equation 3.

$$v_{ab} = -V_m^+\sin(\omega t) - V_m^-\sin(\omega t + \emptyset_v^-) = -V_{mab}\sin(\omega t + \emptyset_{cab}) \quad \text{[Equation 3]}$$

$$v_{bc} = -V_m^+\sin\left(\omega t - \frac{2\pi}{3}\right) - V_m^-\sin\left(\omega t + \emptyset_v^- + \frac{2\pi}{3}\right) = -V_{mbc}\sin(\omega t + \phi_{cbc})$$

$$v_{ca} = -V_m^+\sin\left(\omega t + \frac{2\pi}{3}\right) - V_m^-\sin\left(\omega t + \emptyset_v^- - \frac{2\pi}{3}\right) = -V_{mca}\sin(\omega t + \phi_{cca})$$

where, $V_m^+$ may denote the magnitude of the positive sequence component and $V_m^-$ may the magnitude of the negative sequence component. In addition, $\emptyset_v^+$ denotes the phase of the positive sequence component and $\emptyset_v^-$ may denote the phase of the negative sequence component.

In addition, each of $V_{mab}$, $V_{mbc}$ and $V_{mca}$ may be a sum of the magnitude of the positive sequence component and the magnitude of the negative sequence component, and each of $\emptyset_{cab}$, $\emptyset_{cbc}$ and $\emptyset_{cca}$ may be a sum of the phase of the positive sequence component and the phase of the negative sequence component.

Accordingly, each of $v_{ab}$, $v_{bc}$ and $v_{ca}$ may have the waveform of the AC voltage including the positive sequence components $V_m^+$ and $\emptyset_v^+$ and the negative sequence components $V_m^-$ and $\emptyset_v^-$. At this time, the voltages $v_{ab}$, $v_{bc}$, $v_{ca}$ applied to the clusters 130, 132 and 134 do not include the zero-sequence component, because the zero-sequence component is not present in the delta connection topology.

Current flowing in the first-phase cluster 130 may be $i_{ab}$, current flowing in the second-phase cluster 132 may be $i_{bc}$, and current flowing in the third-phase cluster 134 may be $i_{ca}$.

$i_{ab}$, $i_{bc}$ and $i_{ca}$ may be expressed as shown in Equation 4.

$$i_{ab} = -I_m^+\sin(\omega t + \phi_i^+) - I_m^-\sin(\omega t + \phi_i) - I_0\sin(\omega t + \phi_0) = \quad \text{[Equation 4]}$$
$$-I_{mab}\sin(\omega t + \phi_{ab}) - I_0\sin(\omega t + \phi_0)$$

$$i_{bc} = -I_m^+\sin\left(\omega t + \phi_i^+ - \frac{2\pi}{3}\right) - I_m^-\sin\left(\omega t + \phi_i^- + \frac{2\pi}{3}\right) -$$
$$I_0\sin(\omega t + \phi_0) = -I_{mbc}\sin(\omega t + \phi_{bc}) - I_0\sin(\omega t + \phi_0)$$

$$i_{ca} = -I_m^+\sin\left(\omega t + \phi_i^+ + \frac{2\pi}{3}\right) - I_m^-\sin\left(\omega t + \phi_i^- - \frac{2\pi}{3}\right) -$$
$$I_0\sin(\omega t + \phi_0) = -I_{mca}\sin(\omega t + \phi_{ca}) - I_0\sin(\omega t + \phi_0)$$

where, $I_m^+$ may denote the magnitude of the positive sequence component and $I_m^-$ may denote the magnitude of the negative sequence component. In addition, $\emptyset_i^+$ may denote the phase of the positive sequence component, $\emptyset_i^-$ may denote the phase of the negative sequence component, and $\emptyset_0$ may be the phase of the zero-sequence component.

In addition, each of $I_{mab}$, $I_{mbc}$ and $I_{mca}$ may denote a sum of the positive sequence component and the negative sequence component and each of $\emptyset_{ab}$, $\emptyset_{bc}$ and $\emptyset_{ca}$ may denote a sum of the phase of the positive sequence component and the phase of the negative sequence component.

Accordingly, each of $i_{ca}$, $i_{cb}$ and $i_{cc}$ may have the waveform of AC current including the positive sequence components $I_m^+$ and $\emptyset_i^+$, the negative sequence components $I_m^-$ and $\emptyset_i^-$ and the zero-sequence components $I_0$ and $\emptyset_0$.

In the embodiment, an energy error value is extracted based on energy generated by the voltages and currents of the clusters 130, 132 and 134, an offset signal having a zero-sequence component is calculated based on the extracted energy error value, and the offset signal having the calculated zero-sequence component is applied as a compensation signal to drive the cells 136 of the clusters 130, 132 and 134, thereby performing uniform control among the clusters 130, 132 and 134.

The offset signal may be an offset voltage value of the zero-sequence component in the first-phase to third-phase clusters 130, 132 and 134 having the star connection topology.

The offset signal may be an offset current value of the zero-sequence component in the first-phase to third-phase clusters 130, 132 and 134 having a delta connection topology.

Figure 5:
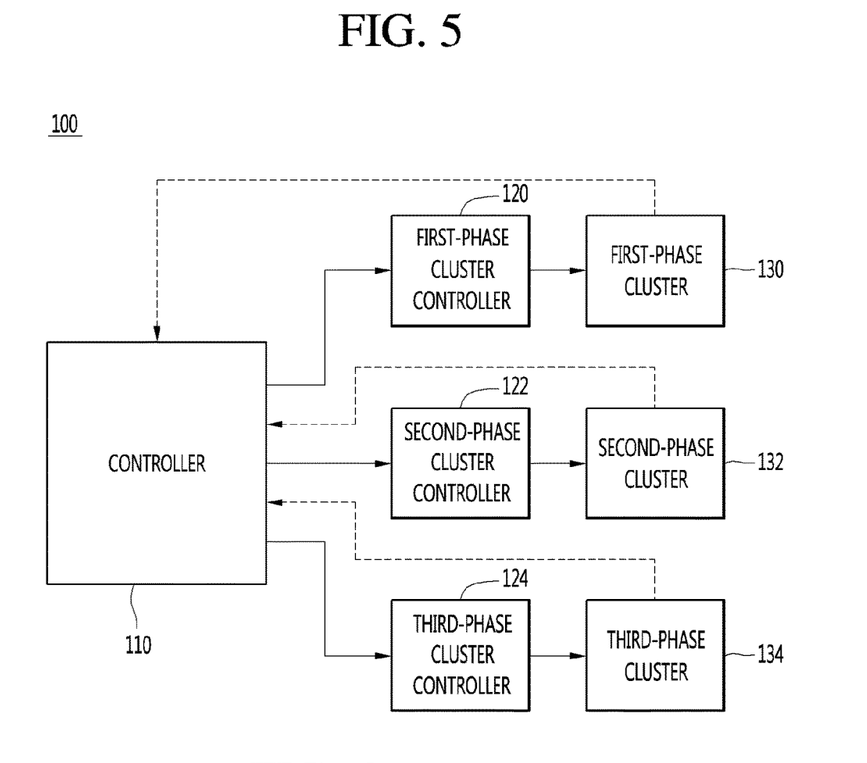
FIG. 5 is a block diagram showing a reactive power compensator having a star connection topology according to an embodiment.

FIG. 5 is a block diagram showing a reactive power compensator having a star connection topology according to an embodiment.

Referring to FIG. 5, the reactive power compensator 100 having the star connection topology according to the embodiment may include a controller 110, first-phase to third-phase cluster controllers 120, 122 and 124 and first-phase to third-phase clusters 130, 132 and 134.

Each of the first-phase, second-phase and third-phase clusters 130, 132 and 134 includes a plurality of cells 136 connected to each other in series as shown in FIG. 3 and each cell 136 may include a plurality of switching elements, a plurality of diodes connected to the switching elements in parallel, and capacitors.

As described below, the reactive power compensator 101 having a delta connection topology may have the same configuration as FIG. 5. However, in the reactive power compensator 101 having a delta connection topology, the first-phase to third-phase clusters 130, 132 and 134 may have the structure shown in FIG. 4.

Referring to FIG. 5 again, the first-phase to third-phase cluster controllers 120, 122 and 124 may control the first-phase to third-phase clusters 130, 132 and 134, respectively.

Alternatively, one cluster controller may control the first-phase to third-phase clusters 130, 132 and 134 without being limited thereto.

The first-phase to third-phase cluster controllers 120, 122 and 124 may generate first to third switching control signals for controlling the first-phase to third-phase clusters 130, 132 and 134.

Specifically, the first-phase cluster controller 120 may generate a first switching control signal for controlling the cells 136 of the first-phase cluster 130. The second-phase cluster controller 122 may generate a second switching control signal for controlling the cells 136 of the second-phase cluster 132. The third-phase cluster controller 124 may generate a third switching control signal for controlling the cells 136 of the third-phase cluster 134.

The first-phase to third-phase cluster controllers 120, 122 and 124 may generate the first to third switching control signals based on command values and/or control signals received from the controller 110.

The controller 110 may control the first-phase to third-phase cluster controllers 120, 122 and 124. That is, the controller 110 may generate command values for controlling the first-phase to third-phase cluster controllers 120, 122 and 124.

Specifically, the controller 110 may generate the command values based on an offset signal having a zero-sequence component along with power state information acquired from the power system 140, and/or state information of the first-phase to third-phase clusters 130, 132 and 134 and state information of the cells 136 of each of the clusters 130, 132 and 134. The generated command value may be transmitted to the first-phase to third-phase controllers 120, 122 and 124.

The state information of the cells 136 of each of the clusters 130, 132 and 134 may include whether each cell 136 is eliminated and is out of order, voltage information of each cell 136, etc.

The state information of each of the first-phase to third-phase clusters 130, 132 and 134 may be voltage and/or current information. For example, the state information of each of the first-phase to third-phase clusters 130, 132 and 134 may include voltage values $v_{can}$, $v_{cbn}$ and $v_{ccn}$ and current values $i_{ca}$, $i_{cb}$ and $i_{cc}$ detected by the first-phase to third-phase clusters 130, 132 and 134 without being limited thereto.

To this end, a current transformer and a potential transformer may be provided in each of the first-phase to third-phase clusters 130, 132 and 134.

The controller 110 may perform phasor transformation based on the voltage values $v_{can}$, $v_{cbn}$ and $v_{ccn}$ and current values $i_{ca}$, $i_{cb}$ and $i_{cc}$ detected by the first-phase to third-phase clusters 130, 132 and 134, calculate a zero-sequence component therefrom, and generate an offset signal including the zero-sequence component.

In the case of a converter having a star connection topology, the zero-sequence component may be a zero-sequence voltage value. In the case of a converter having a delta connection topology, the zero-sequence component may be a zero-sequence current value.

The generated offset signal may be applied to or included in the command values such that the cells 136 of the first-phase to third-phase clusters 130, 132 and 134 may be switched. As the cells 136 are switched according to the command values, to which the offset signal is applied, energy errors of the first-phase, second-phase and third-phase clusters 130, 132 and 134 are compensated for and removed and, as a result, energy of the first-phase to third-phase clusters 130, 132 and 134 may be uniformly maintained.

The controller 110 and the first-phase to third-phase cluster controllers 120, 122 and 124 may perform wired or wireless communication. In addition, the first-phase to third-phase cluster controllers 120, 122 and 124 and the first-phase to third-phase clusters 130, 132 and 134 may perform wired or wireless communication without being limited thereto.

In the embodiment, by compensating for energy error between first-phase to third-phase clusters 130, 132 and 134 in real time by the zero-sequence component calculated through phasor transformation, the response speed of error compensation is fast or excellent and overshooting or transient phenomenon can be minimized.

Figure 6:
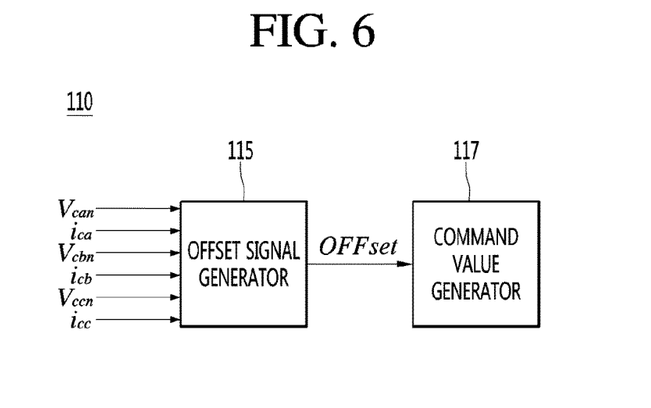
FIG. 6 is a block diagram showing a controller in detail.

FIG. 6 is a block diagram showing the controller in detail.

Referring to FIGS. 5 and 6, the controller 110 may include an offset signal generator 115 and a command value generator 117.

The voltage values $v_{can}$, $v_{cbn}$ and $v_{ccn}$ and the current values $i_{ca}$, $i_{cb}$ and $i_{cc}$ detected by the first-phase to third-phase clusters 130, 132 and 134 may be input to the offset signal generator 115.

Each of the voltage values $v_{can}$, $v_{cbn}$ and $v_{ccn}$ and the current values $i_{ca}$, $i_{cb}$ and $i_{cc}$ may be expressed as shown in Equations 1 and 2.

The offset signal generator 115 may generate an offset signal OFFset through phasor transformation using the voltage values $v_{can}$, $v_{cbn}$ and $v_{ccn}$ and the current values $i_{ca}$, $i_{cb}$, and $i_{cc}$.

A method of generating the offset signal OFFset will be described in greater detail with reference to FIGS. 7 and 8.

Figure 7:
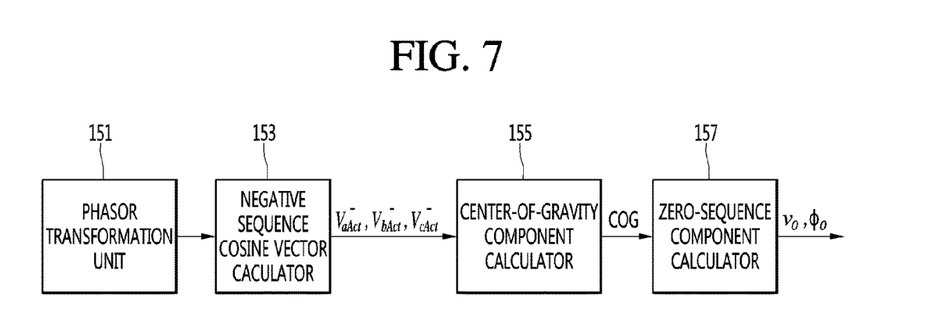
FIG. 7 is a block diagram showing an offset signal generator in detail.

FIG. 7 is a block diagram showing an offset signal generator in detail, and FIG. 8A to FIG. 8D is a phasor diagram showing a process of generating an offset signal.

Referring to FIGS. 5 to 8, the offset signal generator 115 may include a phasor transformation unit 151, a negative sequence cosine vector calculator 153, a center-of-gravity component calculator 155 and a zero-sequence component calculator 157.

Figure 8A:
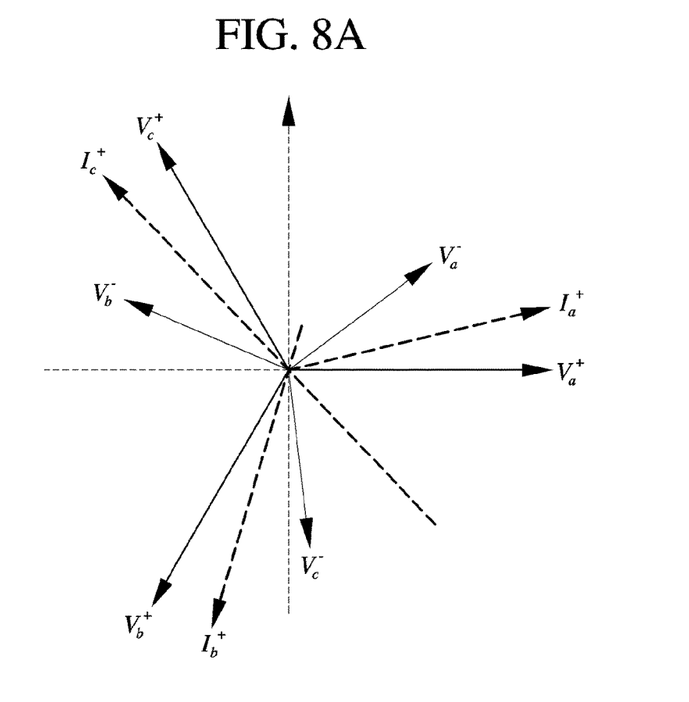
FIG. 8A to FIG. 8D is a phasor diagram showing a process of generating an offset signal.

The phasor transformation unit 151 may perform phasor transformation with respect to the voltage values $v_{can}$, $v_{cbn}$ and $v_{ccn}$ and the current values $i_{ca}$, $i_{cb}$ and $i_{cc}$ respectively detected by the first-phase to third-phase clusters 130, 132 and 134, thereby generating a phasor diagram as shown in FIG. 8A.

The phasor diagram may be generated based on the current value when the negative sequence component is 0 among the positive sequence component $V_m^+$ and the negative sequence component $V_m^-$ of the voltage values $v_{can}$, $v_{cbn}$ and $v_{ccn}$ shown in Equation 1 and the current values shown in Equation 2, that is, the positive sequence component of the current value.

The phasor diagram is shown in FIG. 8A.

As shown in FIG. 8A, the first-phase positive sequence voltage vector value $V_a^+$, the second-phase positive sequence voltage vector value $V_b^+$ and the third-phase positive sequence voltage vector value $V_c^+$ may be located on the phasor diagram. The locations of the first-phase positive sequence voltage vector value $V_a^+$, the second-phase positive sequence voltage vector value $V_b^+$ and the third-phase positive sequence voltage vector value $V_c^+$ on the phasor diagram may be changed according to the magnitudes and phases thereof.

Each of the first-phase to third-phase positive sequence voltage vector values $V_a^+$, $V_b^+$, $V_c^+$ may be associated with the magnitude Vm+ of the positive sequence component.

In addition, the first-phase negative sequence voltage vector value $V_a^-$, the second-phase negative sequence voltage vector value $V_b^-$ and the third-phase negative sequence voltage vector value $V_c^-$ may be located on the phasor diagram. The locations of the first-phase negative sequence voltage vector value $V_a^-$, the second-phase negative sequence voltage vector value $V_b^-$ and the third-phase negative sequence voltage vector value $V_c^-$ on the phasor diagram may be changed according to the magnitudes and phases thereof.

Each of the first-phase to third-phase negative sequence voltage vector values $V_a^-$, $V_b^-$, $V_c^-$ may be associated with the magnitude $V_m^-$ of the negative sequence component and the phase $\emptyset_v^-$ of the negative sequence component.

In addition, a first-phase positive sequence current vector value $I_a^+$, a second-phase positive sequence current vector value $I_b^+$ and a third-phase positive sequence current vector value $I_c^+$ may be located on the phasor diagram. The locations of the first-phase positive sequence current vector value $I_a^+$, the second-phase positive sequence current vector value $I_b^+$ and the third-phase positive sequence current vector value $I_c^+$ on the phasor diagram may be changed according to the magnitudes and phases thereof.

Each of the first-phase to third-phase positive sequence current vector values $I_a+$, $I_b^+$ and $I_c^+$ may be associated with the magnitude $I_m^+$ of the positive sequence component and the phase $\emptyset_i^+$ of the positive sequence component.

Although the first-phase positive sequence voltage vector value $V_a^+$ is shown as being coincident with the horizontal axis in FIG. 8A, the present invention is not limited thereto.

If the first-phase positive sequence voltage vector value $V_a^+$ is coincident with the horizontal axis (x axis), the locations of the other values, that is, the second-phase positive sequence voltage vector value $V_b^+$, the third-phase positive sequence voltage vector value $V_c^+$, the first-phase negative sequence voltage vector value $V_a^-$, the second-phase negative sequence voltage vector value $V_b^-$, the third-phase negative sequence voltage vector value $V_c^-$, the first-phase positive sequence current vector value $I_a^+$, the second-phase positive sequence current vector value $I_b^+$ and the third-phase positive sequence current vector value $I_c^+$ based on the first-phase positive sequence voltage vector Va+.

Figure 8B:
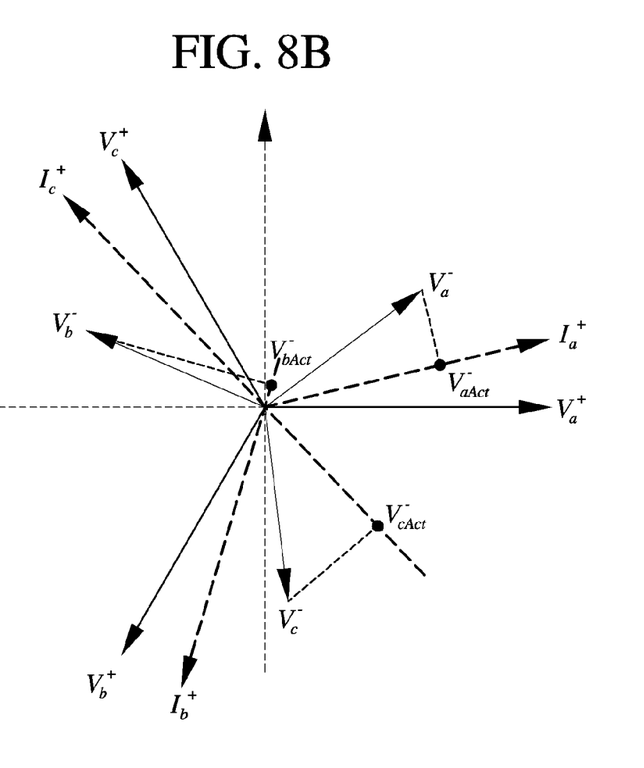

As shown in FIG. 8B, the negative sequence cosine vector calculator 153 may calculate first-phase to third-phase negative sequence cosine components $V_{aAct}^-$, $V_{bAct}^-$ and $V_{cAct}^-$ in which the first-phase to third-phase negative sequence voltage vector values $V_a^-$, $V_b^-$ and $V_c^-$ respectively meet the first-phase to third-phase positive sequence current vector values $I_a^+$, $I_b^+$ and $I_c^+$ on the phasor diagram.

That is, the first-phase negative sequence cosine component $V_{aAct}^-$ in which the first-phase negative sequence voltage vector value $V_a^-$ meets the first-phase positive sequence current vector value $I_a^+$ may be calculated.

The second-phase negative sequence cosine component $V_{bAct}^-$ in which the second-phase negative sequence voltage vector value $V_b^-$ meets the second-phase positive sequence current vector value $I_b^+$ may be calculated.

The third-phase negative sequence cosine component $V_{cAct}^-$ in which the third-phase negative sequence voltage vector value $V_c^-$ meets the third-phase positive sequence current vector value $I_b^+$ may be calculated.

The first-phase to third-phase negative sequence current vector values $I_a^-$, $I_b^-$ and $I_b^-$ may be used to calculate the first-phase to third-phase negative sequence cosine components $V_{aAct}^-$, $V_{bAct}^-$ and $V_{cAct}^-$ instead of the first-phase to third-phase positive sequence current vector values $I_a^+$, $I_b^+$ and $I_b^+$, without being limited thereto.

The first-phase to third-phase negative sequence cosine components $V_{aAct}^-$, $V_{bAct}^-$ and $V_{cAct}^-$ may be expressed as shown in Equation 5.

$$V_{aAct}^- = |V_m^-|\cos(\Phi_v^- - \Phi_{cia})*\sin(wt+\Phi_v^- - \Phi_{cia}) = |V_m^-|\cos(\Phi_v^- - \Phi_{cia})|\angle(\Phi_v^- - \Phi_{cia})$$

$$V_{bAct}^- = |V_m^-|\cos(\Phi_v^- - \Phi_{cib})*\sin(wt+\Phi_v^- - \Phi_{cib}+2\pi/3)$$
$$= |V_m^-|\cos(\Phi_v^- - \Phi_{cib}-2\pi/3)|\angle(\Phi_V^- - \Phi_{cib}+2\pi/3)$$

$$V_{cAct}^- = |V_m^-|\cos(\Phi_v^- - \Phi_{cic})*\sin(wt+\Phi_v^- - \Phi_{cic}-2\pi/3)$$
$$= |V_m^-|\cos(\Phi_v^- - \Phi_{cic}+2\pi/3)|\angle(\Phi_v^- - \Phi_{cic}-2\pi/3) \quad \text{[Equation 5]}$$

Figure 8C:
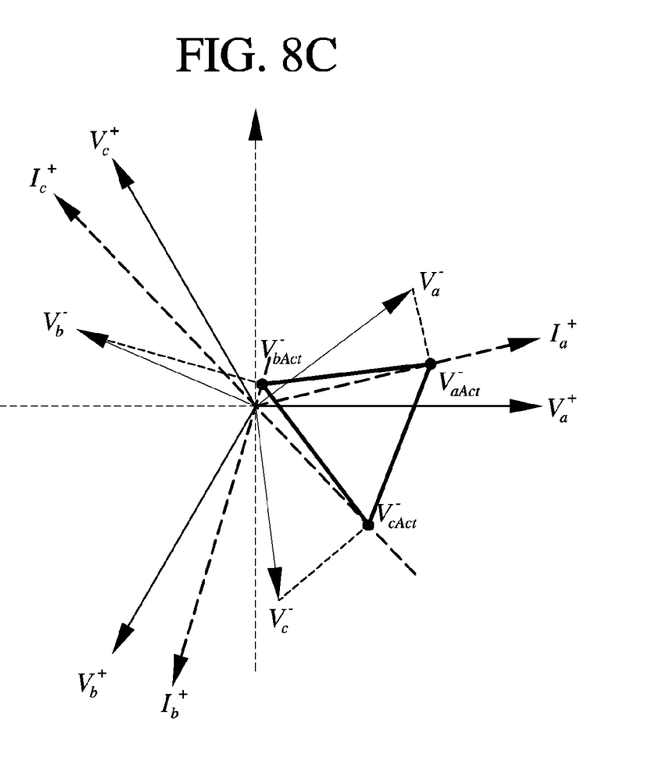

The center-of-gravity component calculator 155 may calculate a center-of-gravity component COG based on the first-phase to third-phase negative sequence cosine components $V_{aAct}^-$, $V_{bAct}^-$ and $V_{cAct}^-$ as shown in FIG. 8C. The center-of-gravity component COG is a vector located at a center of the first-phase to third-phase negative sequence cosine components $V_{aAct}^-$, $V_{bAct}^-$ and $V_{cAct}^-$ and may have a magnitude and phase from the origin. The origin may be an intersection between the horizontal axis (x axis) and the vertical axis (y axis).

The voltage $V_{COG}$ of the center-of-gravity component COG may be expressed as shown in Equation 6.

$$V_{COG} = \frac{(V_{aAct}^- + V_{bAct}^- + V_{cAct}^-)}{3} \quad \text{[Equation 6]}$$

The distances from the first-phase to third-phase negative sequence cosine components $V_{aAct}^-$, $V_{bAct}^-$ and $V_{cAct}^-$ to the center-of-gravity component COG may be the same. That is, the distance between the first-phase negative sequence cosine component $V_{aAct}^-$ and center-of-gravity component COG may be equal to the distance between the second-phase negative sequence cosine component $V_{aAct}^-$ and the center-of-gravity component COG. The distance between the second-phase negative sequence cosine component $V_{bAct}^-$ and the center-of-gravity component COG may be equal to the distance between the third-phase negative sequence cosine component $V_{cAct}^-$ and the center-of-gravity component COG. The distance between the third-phase negative sequence cosine component $V_{cAct}^-$ and the center-of-gravity component COG may be equal to the distance between the first-phase negative sequence cosine component $V_{aAct}^-$ and the center-of-gravity component COG.

Figure 8D:
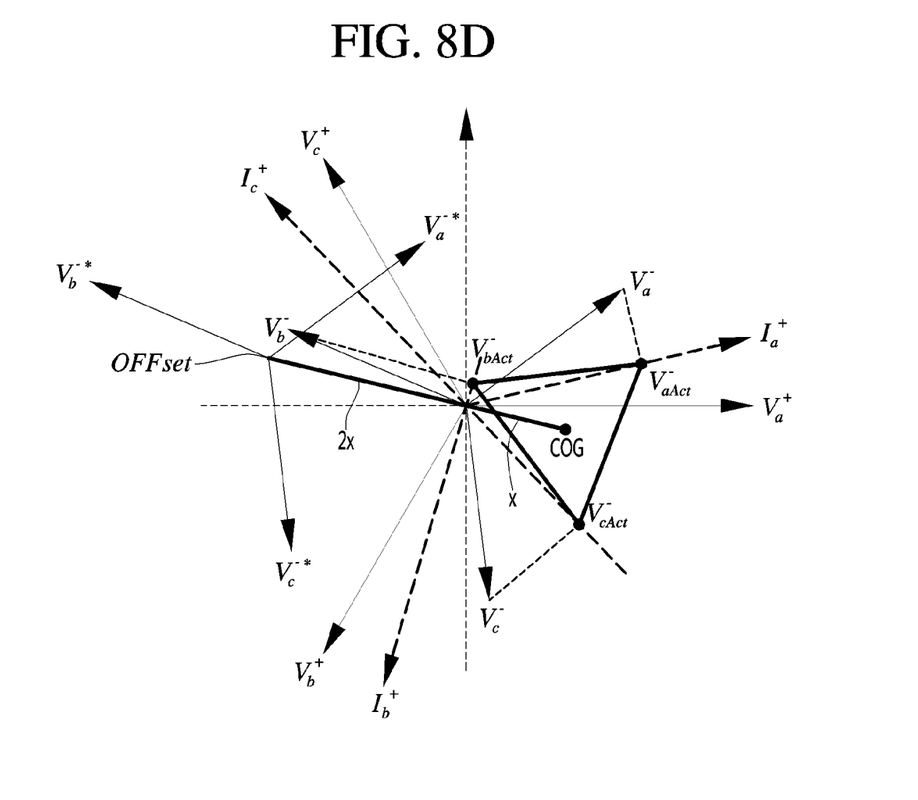

The zero-sequence component calculator 157 may calculate the zero-sequence components $v_0$ and $\varnothing_0$ based on the center-of-gravity component COG as shown in FIG. 8D. That is, the zero-sequence component may be a vector having a zero-sequence magnitude $v_0$ and a zero-sequence phase $\varnothing_0$.

The zero-sequence components $v_0$ and $\varnothing_0$ may be expressed as shown in Equation 7.

$$|v_0| \angle \varnothing_0 = 2|V_{COG}| \angle (\pi + \varnothing_{COG})$$ [Equation 7]

That is, the magnitude of the center-of-gravity component COG, that is, a first distance value x from the origin to the center-of-gravity component COG, may be calculated.

Subsequently, a second distance value 2x that is origin-symmetrical to a first distance value x and the phase of the second distance value 2x may be calculated.

The second distance value 2x is located in an opposite direction to a direction from the origin to the center-of-gravity component COG and may be twice the first distance value x.

Accordingly, the second distance value 2x becomes the zero-sequence voltage $v_0$ and the phase of the second distance value 2x may be a zero-sequence phase $\varnothing_0$. That is, the zero-sequence components $v_0$ and $\varnothing_0$ may be calculated.

These zero-sequence components $v_0$ and $\varnothing_0$ may be used as an offset signal OFFset for compensating for energy error between the first-phase to third-phase clusters 130, 132 and 134.

By the offset signal OFFset, the first-phase negative sequence voltage vector value $V_a^-$, the second-phase negative sequence voltage vector value $V_b^-$ and the third-phase negative sequence voltage vector value $V_c^-$ may be compensated by a first-phase compensation negative sequence voltage vector value $V_a^{-*}$, a second-phase compensation negative sequence voltage vector value $V_b^{-*}$, and a third-phase compensation negative sequence voltage vector value $V_c^{-*}$.

That is, referring to FIG. 6, the command value generator 117 may generate the command values based on the offset signal OFFset including the zero-sequence components $v_0$ and $\varnothing_0$. The generated command values may be delivered to the first-phase to third-phase cluster controllers 120, 122 and 124, and the first-phase to third-phase cluster controllers 120, 122 and 124 may generate first to third switching signals according to the command values. The first to third switching control signals may be delivered to the first-phase to third-phase clusters 130, 132 and 134, such that the plurality of cells of the first-phase to third-phase clusters 130, 132 and 134 may be switched in response to the first to third switching control signals. Therefore, the first-phase negative sequence voltage vector value $V_a^-$, the second-phase negative sequence voltage vector value $V_b^-$ and the third-phase negative sequence voltage vector value $V_c^-$ may be compensated by the first-phase compensation negative sequence voltage vector value $V_a^{-*}$, the second-phase compensation negative sequence voltage vector value $V_b^{-*}$, and the third-phase compensation negative sequence voltage vector value $V_c^{-*}$, thereby performing uniform energy control among the first-phase to third-phase clusters 130, 132 and 134.

The command value generator 117 may generate individual command values of the first-phase to third-phase cluster controllers 120, 122 and 124 without being limited thereto.

The reactive power compensator having a star connection topology has been described above.

The energy uniform control method of the reactive power compensator having a star connection topology is equally applicable to the reactive power compensator having a delta connection topology.

However, the offset signal OFFset calculated in the reactive power compensator having a delta connection topology may have the magnitude and phase $i_0$ and $\varnothing_0$ of zero-sequence current.

The above-described control method is a uniform control method using feedforward control.

The embodiment is applicable to feedback control in addition to feedforward control.

In feedback control, the offset signal OFFset including the zero-sequence components $v_0$ and $\varnothing_0$ may be directly generated from the energy errors of the first-phase to third-phase clusters 130, 132 and 134 and the plurality of cells 136 of the first-phase to third-phase clusters 130, 132 and 134 is switched according to the command values, to which the offset signal OFFset is applied. Therefore, energy of the first-phase to third-phase clusters 130, 132 and 134 is controlled to be uniformly maintained, thereby improving product reliability and stability.

In addition, both feedforward control and feedback control may be performed in the embodiment.

According to at least one of the embodiments, energy errors among first-phase to third-phase clusters are compensated for in real time by the zero-sequence component calculated through phasor transformation, thereby obtaining excellent error compensation responsiveness and minimizing overshoot or transient phenomenon.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A reactive power compensator for compensating for reactive power of a power system, the reactive power compensator comprising:

a plurality of phase clusters each including a plurality of cells, wherein the plurality of phase clusters comprises a first-phase cluster, a second-phase cluster, and a third-phase cluster; and a controller configured to control the plurality of phase clusters, wherein the controller includes:

a phasor transformation unit configured to perform phasor transformation with respect to voltage values and current values of the first-phase cluster, the second phase cluster, and the third-phase cluster to generate a phasor diagram;

a negative sequence cosine vector calculator configured to calculate first-phase to third-phase negative sequence cosine components on the generated phasor diagram;

a center-of-gravity component calculator configured to calculate a center-of-gravity component based on the calculated first-phase to third-phase negative sequence cosine components; and a zero-sequence component calculator configured to calculate a zero-sequence component based on the calculated center-of-gravity component, wherein the controller is configured:
to generate an offset signal including the zero-sequence component; and
to compensate for energy errors between the plurality of phase clusters based on the generated offset signal.

2. The reactive power compensator according to claim 1, wherein, when the plurality of phase clusters has a star connection topology, the offset signal is a zero-sequence voltage.

3. The reactive power compensator according to claim 1, wherein, when the plurality of phase clusters has a delta connection topology, the offset signal is a zero-sequence current.

4. The reactive power compensator according to claim 1, wherein the phasor diagram is generated based on positive sequence components and negative sequence components of the voltage values and positive sequence components of the current values.

5. The reactive power compensator according to claim 4, wherein each of the first-phase to third-phase negative sequence cosine components is located at a point where each of first-phase to third-phase negative sequence voltage vector values of the voltage values meets each of first-phase to third-phase positive sequence current vector values of the current values.

6. The reactive power compensator according to claim 1, wherein the center-of-gravity component is located at a center of the first-phase to third-phase negative sequence cosine components.

7. The reactive power compensator according to claim 1, wherein distances from the first-phase to third-phase negative sequence cosine components to the center-of-gravity component are equal.

8. The reactive power compensator according to claim 1, wherein, when a distance value from an origin which is crossing of an x axis and a y axis of the phasor diagram to the center-of-gravity component is a first distance value, the zero-sequence component includes a second distance value that is origin-symmetrical to the first distance value, and a phase of the second distance value.

9. The reactive power compensator according to claim 8, wherein the second distance value is located in an opposite direction to a direction from the origin to the center-of-gravity component, and is twice the first distance value.

10. The reactive power compensator according to claim 8, wherein the second distance value is a zero-sequence voltage and the phase of the second distance value is a zero-sequence phase.

11. The reactive power compensator according to claim 1, wherein the controller further includes a command value generator that performs control to generate a command value based on the offset signal and to switch the plurality of phase clusters according to the command value.

12. The reactive power compensator according to claim 1, wherein the phasor transformation unit makes at least one of positive sequence voltage vector values of the voltage values coincident with a horizontal axis (x axis) to generate the phasor diagram.

13. The reactive power compensator according to claim 12, wherein the phasor transformation unit determines the locations of the other positive sequence voltage vector values, first-phase to third-phase negative sequence voltage vector values and first-phase to third-phase positive sequence current vector values based on the at least one of the positive sequence voltage vector values coincident with the horizontal axis.

14. A method of controlling a reactive power compensator for compensating for reactive power of a power system, the method comprising:
performing phasor transformation with respect to voltage values and current values of a plurality of phase clusters each including a plurality of cells to generate a phasor diagram;
generating an offset signal on the phasor diagram;
generating a command value, to which the offset signal of a zero-sequence component is applied; and
controlling the plurality of phase clusters using the command value to compensate for energy errors between the plurality of phase clusters,
wherein the generating of the offset signal includes:
calculating first-phase to third-phase negative sequence cosine components on the generated phasor diagram;
calculating a center-of-gravity component based on the calculated first-phase to third-phase negative sequence cosine components; and
calculating the zero-sequence component based on the calculated center-of-gravity component.

15. The method according to claim 14, wherein each of the first-phase to third-phase negative sequence cosine components is located at a point where each of first-phase to third-phase negative sequence voltage vector values of the voltage values meets each of first-phase to third-phase positive sequence current vector values of the current values.

16. The method according to claim 14, wherein the center-of-gravity component is located at a center of the first-phase to third-phase negative sequence cosine components.

17. The method according to claim 14, wherein, when a distance value from an origin which is crossing of an x axis and a y axis of the phasor diagram to the center-of-gravity component is a first distance value, the zero-sequence component includes a second distance value that is origin-symmetrical to the first distance value, and a phase of the second distance value.

18. The method according to claim 17, wherein the second distance value is located in an opposite direction of a direction from the origin to the center-of-gravity component, and is twice the first distance value.

19. The method according to claim 18, wherein the second distance value is a zero-sequence voltage and the phase of the second distance value is a zero-sequence phase.

20. The method according to claim 14, wherein the generating of the phasor diagram further includes making at least one of positive sequence voltage vector values of the voltage values coincident with a horizontal axis (x axis) to generate the phasor diagram.

21. The method according to claim 20, wherein the generating of the phasor diagram further includes determining locations of the other positive sequence voltage vector values, first-phase to third-phase negative sequence voltage vector values and first-phase to third-phase positive sequence current vector values based on the at least one of the positive sequence voltage vector values coincident with the horizontal axis.

22. The method according to claim 14, wherein, when the plurality of phase clusters has a star connection topology, the offset signal is a zero-sequence voltage.

23. The method according to claim 14, wherein, when the plurality of phase clusters has a delta connection topology, the offset signal is a zero-sequence current.

24. The method according to claim 14, wherein distances from the first-phase to third-phase negative sequence cosine components to the center-of-gravity component are equal.

* * * * *